Aug. 4, 1936.  G. BRAUN  2,049,488
EXTRACTION OF OSMIUM FROM ORES AND MINERALS
Filed Dec. 23, 1933  2 Sheets-Sheet 1
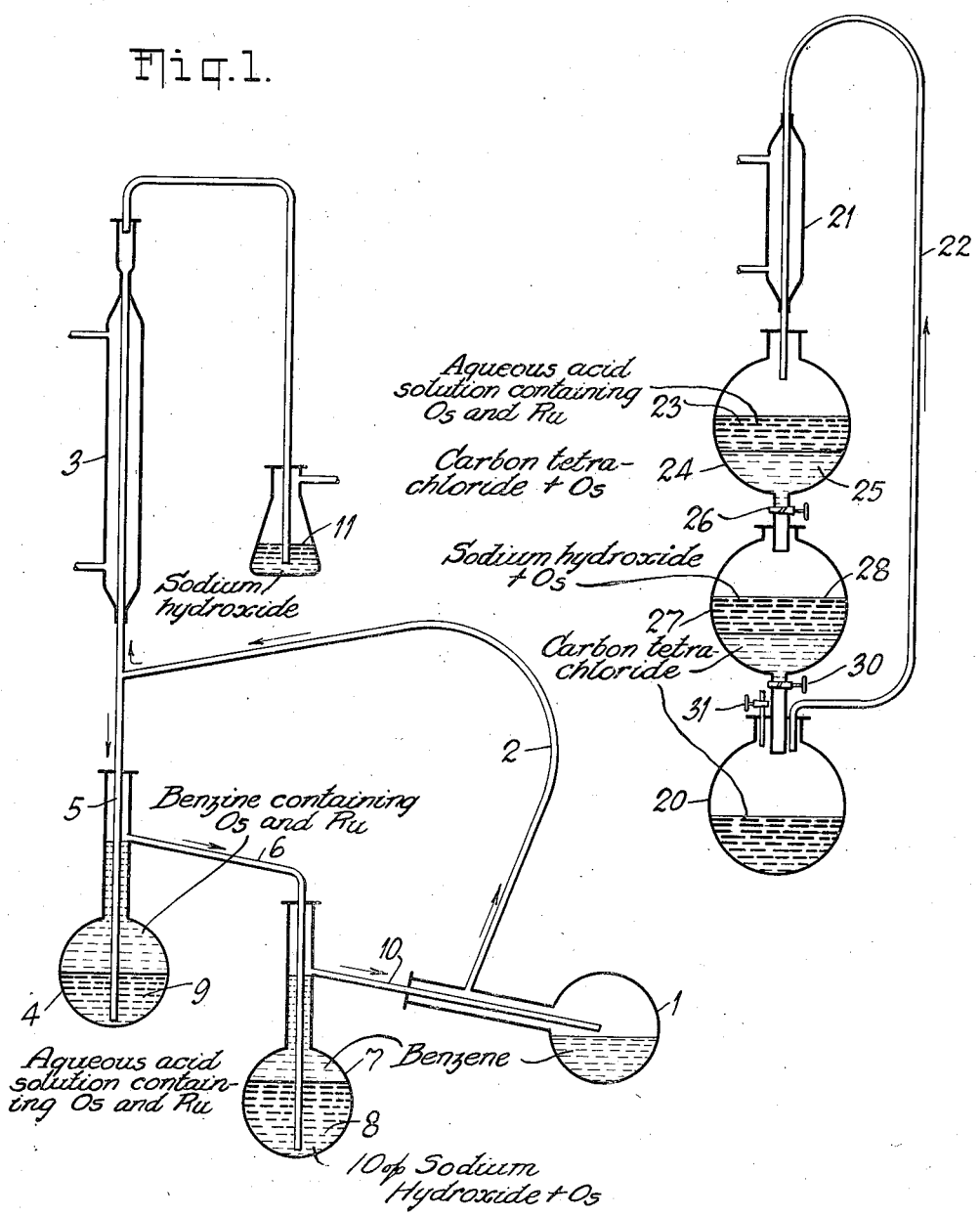
INVENTOR
GEZA BRAUN Aug. 4, 1936.  G. BRAUN  2,049,488

EXTRACTION OF OSMIUM FROM ORES AND MINERALS

Filed Dec. 23, 1933    2 Sheets-Sheet 2

Fig. 3.

Separation of Osmium
and Ruthenium from Platinum-group
Metals

Present: Pt, Ir, Rd, Pd, Os, Ru.
Crude platinum or osmiridium is
treated with zinc then dissolved
in 20% $H_2SO_4$ and filtered.

Precipitate:
Amorphous Pt, Ir, Rd, Pd:
Os and Ru. Heated with
NaOH and $NaClO_3$, dissolved
in water and filtered.

Filtrate:
Zn $SO_4$ solution
discarded.

Filtrate:
Sodium osmate
Sodium Ruthenate, with
some Pt, Ir, Rd, Pd oxides.
Acidified with HCl, extracted
with carbon tetrachloride.

Precipitate:
Oxides of Pt, Ir, Rd, Pd

Carbon tetrachloride
solution:
Osmium Tetroxide

Aqueous solution:
Ruthenium chloride with some
Pt, Ir, Rd, Pd chlorides; made
alkaline, saturated with
chlorine and distilled Distillate:
Ruthenium Tetroxide Residue chlorides of
Pt, Ir, Rd, Pd; made alkaline,
some alcohol added and
boiled, filtered Filtrate:
discarded Precipitate:
Oxides of Pt, Ir, Rd, Pd;
united with the main part
of oxides.

INVENTOR
GEZA BRAUN
BY
Watson, Bristol, Johnson & Leavenworth
ATTORNEYS

Patented Aug. 4, 1936

2,049,488

UNITED STATES PATENT OFFICE 2,049,488

EXTRACTION OF OSMIUM FROM ORES AND MINERALS

Géza Braun, New York, N. Y., assignor to Standard Brands Incorporated, New York, N. Y., a corporation of Delaware Application December 23, 1933, Serial No. 703,860

15 Claims. (Cl. 23—19)

The invention relates to a method for the separation of osmium from osmium containing materials. More particularly, it relates to the separation of osmium and ruthenium from the other platinum group metals, i. e., platinum, iridium, rhodium and palladium, and of osmium from ruthenium, and includes correlated improvements and discoveries whereby the separation of osmium may be enhanced.

In previous procedures osmium has been isolated from the other elements of the platinum group by a method dependent upon the volatility of certain osmium compounds, especially the tetroxide, also denominated osmic acid. The separation was effected by converting the osmium into an amorphous variety and then dissolving the amorphous metallic osmium in aqua regia, or the metal oxidized with strong oxidizing agents in molten alkali and subsequently acidifying with nitric acid. The osmium was thus converted into osmic acid, distilled from the solution containing it, the osmic acid vapors collected, and the acid used as such or reduced to metallic osmium. When proceeding in accordance with the foregoing method the recovery of osmium is costly and attended by danger inasmuch as the vapors of osmic acid are of a very poisonous nature.

It is an object of the invention to provide a method for the extraction or separation of osmium which is unattended by release of dangerous fumes or vapors and which may be efficiently, readily and economically practiced commercially.

Another object of the invention is to provide a method for the separation of osmium and ruthenium from other platinum group metals, and of osmium from ruthenium, which separations are quantitative.

A further object of the invention is to provide a method for the separation of osmium in which the osmium is converted into its tetroxide, that is, osmic acid, and then separated from ruthenium and platinum group metals by extraction with an organic solvent.

An additional object of the invention is to provide an osmium solution which is stable and which contains the osmium as an osmate in an alkaline solution having a content of hypochlorite.

Other objects of the invention will in part be obvious and will in part appear hereinafter.

The invention accordingly comprises the several steps and the relation of one or more of such steps with respect to each of the others, and the stable osmium solution possessing the features, properties and the relation of constituents which are exemplified in the following detailed disclosure and the scope of the invention will be indicated in the claims.

In the practice of the invention osmium and ruthenium may be separated from the other elements of the platinum group, i. e., platinum, iridium, rhodium and palladium, and the osmium may be subsequently separated from the ruthenium by converting the osmium and ruthenium into a soluble form by treatment of the platinum group constituents in an amorphous condition with a caustic alkali and an oxidizing agent. By this treatment the osmium and ruthenium are converted into the corresponding osmate and ruthenate, whereas the other elements remain as oxides. The osmate and ruthenate are soluble in water and are obtained as a filtrate. The filtrate is acidified with a suitable acid, for example, hydrochloric, sulfuric, phosphoric and acetic acids, which converts the osmium into the corresponding tetroxide and the ruthenium into its corresponding salt as the chloride. The acidified solution is extracted with an organic solvent, preferably a hydrocarbon or a halogenated organic solvent. Specifically, the solvent may be carbon tetrachloride or benzene.

It will be realized, of course, that a compatible mixture of solvents may be used instead of a single solvent material. The extraction with organic solvent yields a solution containing osmium tetroxide and an aqueous acid solution containing the ruthenium with any small amounts of the other platinum group elements which had passed into the filtrate along with the osmium and ruthenium. Thus, there is effected a separation of osmium from ruthenium and the other platinum group metals.

The ruthenium may be separated from the solution containing it in the form of the chloride by making the solution alkaline, saturating with chlorine, and distilling. The distillation preferably is accomplished by means of a stream of chlorine. The ruthenium is in this manner separated and obtained in the distillate as the tetroxide.

More particularly, the osmium and ruthenium or their alloys are converted into amorphous metals and then oxidized with strong oxidizing agents, such as alkali metal chlorates, nitrates, peroxides, etc. This treatment is with an alkali in the molten state, and the osmium and ruthenium are obtained as the corresponding osmates and ruthenates. These are easily soluble in water and are separated by leaching with water from the oxides of the other metals of the platinum group, which are insoluble in the weak alkali.

The aqueous alkali solution containing the alkali metal osmate and ruthenate is now strongly acidified with hydrochloric acid whereupon the osmic acid thus freed is extracted quantitatively with a suitable organic solvent. Osmic acid is taken out completely by the organic solvent whereas the ruthenium which was converted into the chloride by the treatment with hydrochloric acid remains quantitatively in the aqueous solution. The aqueous acid solution freed from osmium is rendered alkaline, saturated with chlorine in the cold, and the ruthenium thus converted into the tetroxide is distilled by means of a stream of chlorine. There is thus effected a separation of osmium and ruthenium from the other metals of the platinum group, and also from each other.

As an illustrative embodiment of a manner in which the separation of osmium and ruthenium can be carried out in practice the following procedure is presented. It will be understood that the conditions, reagents, reactants, etc., specifically mentioned throughout the description are solely illustrative and that they are not to be considered as limiting the scope of the invention.

One part of osmiridium, or crude platinum or platinum concentrate containing an appreciable amount of osmium, is melted with six parts of zinc at red heat for about one to two hours. The mass so obtained is treated with 20% sulfuric acid, and the amorphous metal, which precipitates, is separated by filtration and washed thoroughly with 20% sulfuric acid and then with water. It is then dried in the air and gradually introduced into a molten mixture of 10 parts of potassium hydroxide and 3 parts of potassium chlorate. The mass is kept liquid for about one hour, and frequently stirred. After cooling the mass is extracted with cold water and the insoluble part separated by filtration and washed with sodium hypochlorite solution. The treatment of the precipitate with potassium hydroxide and chlorate may be repeated if the osmium and ruthenium are present in large amounts. Two products are obtained; viz:

(a) An alkaline filtrate containing osmium as potassium osmate, and ruthenium as potassium ruthenate together with small quantities of oxides of the other platinum group metals present in the starting material; and (b) A precipitate consisting of oxides of platinum group metals such as Pt, Ir, Rd and Pd, if present in the starting materials.

The alkaline filtrate (a) is cooled, and acidified with hydrochloric acid until formation of chlorine is noticeable. Then the solution is extracted several times with carbon tetrachloride in an amount which is about half the volume of the solution being extracted, until no more osmic acid remains in the aqueous solution.

The carbon tetrachloride solution contains osmium as osmic acid together with some chlorine. This osmic acid may be recovered from the solution in various manners according to the particular purpose for which it is intended to be used. For example, the osmic acid may be separated from the carbon tetrachloride solution with dilute alkali. Thus an alkaline sodium osmate solution may be obtained which may be reduced to osmium metal by heating with sodium formate, or the osmic acid may be freed by acids and used for catalytic and other purposes as it is, without any further treatment.

The solution now free from osmic acid through the extraction is made alkaline as with sodium hydroxide; saturated with chlorine at 0° C., and distilled in a stream of chlorine. Ruthenium tetroxide distills over and may be collected as such, or preferably in an aqueous alcoholic solution of hydrochloric acid as ruthenium choride. The ruthenium chloride may then be reduced to ruthenium in the usual manner, if desired.

The residue from the distillation is made alkaline again, some alcohol is added, and the mass gently boiled until no more precipitation occurs. The precipitate is separated by filtration, washed with water, dried and united with the main part of oxides of platinum group metals, (b) above, obtained in the initial separation.

The extraction of the solutions containing osmium tetroxide or osmic acid may be carried out in a suitable apparatus for extraction of liquids with liquids in a batch or in a continuous manner. However, on account of the volatility of osmic acid the apparatus is modified in such a manner that it will allow a double extraction, that is, at first the osmic acid is extracted from the aqueous solution by a suitable organic solvent and then the osmic acid is extracted from the organic solvent by dilute alkali, as sodium hydroxide solution before it is returned to the distilling vessel.

Referring to the drawings:

Fig. I illustrates an apparatus for extraction with solvents, having lower specific gravity than the solution to be extracted, for instance benzene. The benzene is boiled in flask 1 on a water bath. The vapors enter the condenser 3 through a tube 2 and thus liquefied flow down to the bottom of the flask 4 through a pipe 5 and pass through the solution 9 to be extracted. The benezene containing osmic acid gradually fills up the flask; overflows through the tube 6 to the bottom of the flask 7, and passing through the dilute 10% sodium hydroxide 8 in the flask 7, is freed from osmic acid. It then overflows through the tube 10 into the distilling flask 1. The extraction is continued until the osmic acid is concentrated as sodium osmate in flask 7. The vapors from the condenser pass a flask 11 containing sodium hydroxide which will retain any osmic acid which escapes through flasks 7 and 1.

Fig. II depicts an apparatus for extraction with solvents having a higher specific gravity, such as carbon tetrachloride. The carbon tetrachloride is boiled in flask 20. The vapors enter the condenser 21 through a tube 22, and thus liquefied drop through the solution 23 to be extracted in flask 24. As soon as sufficient solvent containing osmic acid 25 accumulates on the bottom of flask 24 it is permitted to pass slowly through stopcock 26 into the flask 27 containing sodium hydroxide solution 28. Thus freed from osmic acid it is returned to the distilling flask 20 through stopcock 30. The flow through stopcocks 26 and 30 is so regulated that the rate corresponds to the amount of carbon tetrachloride coming from the condenser, and thus a balance is maintained and the process rendered continuous. Stopcock 31 serves for the regulation of pressure in the apparatus.

The main part of osmic acid is concentrated in the sodium hydroxide solutions in both cases. In the event that a small amount of it goes through the sodium hydroxide solutions, it will be concentrated and possibly reduced to lower oxides in the distilling flasks. This part may easily be recovered by shaking the organic solvent with the sodium hydroxide solution containing sodium hypochlorite.

Fig. III constitutes a flow diagram illustrating the various steps in the procedure, and depicting that which is effected by each step.

In accordance with the foregoing procedure the separation of the osmium from the other elements of the platinum group depends upon the specifically characteristic property of its tetroxide, that is, osmic acid, of being soluble in an organic solvent. The osmic acid is markedly soluble in certain organic solvents, but only moderately soluble in water or dilute acids from which it is capable of being quantitatively extracted by means of the organic solvents. The compounds of the other metals of the platinum group, under the conditions set forth in the procedure, cannot be extracted from an aqueous acid solution by organic solvents. The separation, accordingly, is a quantitative one. Further, it is complete even in the presence of a considerable quantity of ruthenium, although this element is quite similar in its chemical properties to osmium. Thus, it is easily oxidized to an alkali ruthenate and forms a volatile tetroxide. However, there is a difference between the properties of ruthenium and osmium which I have found and which makes their separation possible according to the procedure of the invention.

The osmium and ruthenium tetroxides may be readily converted into corresponding alkali osmates and ruthenates by treatment with dilute caustic alkalies, but when the solution is acidified the sodium osmate is converted again into osmic acid, which may be thoroughly extracted with an organic solvent, as carbon tetrachloride, whereas the ruthenate forms a salt of ruthenium, as the chloride which cannot be extracted by means of the organic solvents. In order to separate osmium and ruthenium satisfactorily and completely from the other elements of the platinum group, it is required that the acidification of the alkali osmate and ruthenate solution be effected by means of an acid which forms stable salts with ruthenium, such as hydrochloric acid, sulfuric acid, etc. If an acid were used which is of a strongly oxidizing character, as nitric acid, chloric acid, etc., the ruthenium would be partially reoxidized to the tetroxide, and hence such acids are not well adapted for use in the separation.

The procedure herein described provides a ready method for the preparation of osmium and its compounds. For such preparation osmiridium or iridosmine, which are natural alloys of osmium and iridium, are particularly well adapted because of their high osmium content. However, use also may be made of crude platinums which contain appreciable amounts of osmium or osmiridium, and minerals containing osmium, such as laurite (a sulfide of ruthenium and osmium) are also suitable as starting materials. It will be understood that particularly desirable results are obtained when native ores and minerals are used which have a high degree of purity. However, osmium may be extracted without difficulty inasmuch as the impurities have very little, if any, effect. The property of extractability possessed by osmic acid is not found in the other elements or materials which may be present.

The method may also be utilized for the recovery of osmium from osmium residues, and for the conversion of osmium compounds into osmium tetroxide. This may be effected in the following manner. The osmium residues, preferably collected in the form of the insoluble sulfide, are suspended in a 20% solution of sodium hydroxide and the solution nearly saturated with chlorine while being agitated and moderately cooled. The osmium residues are quickly converted into sodium osmate. This solution is then acidified with hydrochloric acid and the osmium tetroxide thus freed extracted with an organic solvent.

Extraction of the osmic acid may be effected, as above indicated, by a number of organic solvents. Solvents found to be particularly well adapted may be classified in two groups, namely those that are heavier than water and those that are lighter than water. The solvents heavier than water encompass especially halogenated organic compounds, as the aliphatic and aromatic hydrocarbons, specifically, methylene chloride, chloroform, carbon tetrachloride, pentachloroethane, chlorobenzene and bromobenzene. The solvents lighter than water include aliphatic and aromatic hydrocarbons, especially petroleum ether, benzene, toluene, etc. It will be realized that the organic solvents are not to be limited to those specifically mentioned. A considerable number of other solvents may be used. These solvents, however, are all characterized by the fact that they do not contain a group which is readily oxidized by osmic acid. Such compounds are ether, nitrobenzene, various esters, etc. It is preferable to use a solvent which is stable with respect to all of the reagents and conditions throughout the procedure. In other words the solvent would be capable of withstanding oxidation and chlorination and should not be attacked easily by concentrated hydrochloric acid, sodium hydroxide, or sodium hypochlorite solutions. The solvents particularly preferred are carbon tetrachloride and benzene.

It is desired to point out also that osmic acid readily oxidizes certain organic compounds with accompanying reduction to lower oxides as $Os_2O_3$ and $OsO$, which oxides are insoluble in organic solvents. It is therefore desirable to utilize pure solvents and to prevent contamination thereof by oxidizable materials. Because of this it is advantageous to utilize a solvent containing a halogen, and chlorine is well adapted since thereby a strong oxidizing agent is present which prevents reduction of osmic acid by traces of impurities. Further, such chlorine would be converted by sodium hydroxide into sodium hypochlorite, and the sodium hypochlorite acts as a stabilizer for the sodium osmate solution. A stable osmium solution is thereby obtained which contains an osmate in an alkaline medium and characterized by a content of a hypochlorite, as sodium hypochlorite.

The method for separating osmium herein described may be employed to extract osmium from saturated as well as from weak solutions. The preferred osmic acid concentration is from 1 to 3%. However, the method is wholly satisfactory for the extraction of solutions containing as little as 0.01% of osmic acid.

Since certain changes in carrying out the above method and certain modifications in the stable osmium solution which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method for separating osmium and ruthenium from materials containing the same, which comprises converting osmium and ruthenium into their respective tetroxides contained in an aqueous acid solution, extracting the osmium tetroxide from said solution by means of an organic solvent, and then recovering the ruthenium therefrom by adding an alkali thereto until alkaline, saturating with chlorine, and distilling.

2. A method for separating osmium and ruthenium from materials containing the same, which comprises converting osmium and ruthenium into their respective tetroxides, extracting the osmium tetroxide from a solution acid with hydrochloric acid by means of carbon tetrachloride, and then adding an alkali to the solution containing the ruthenium until alkaline, saturating with chlorine, and distilling the ruthenium as ruthenium tetroxide by means of a stream of chlorine.

3. A method for separating osmium from osmium-containing materials, which comprises forming an alloy by heating said osmium containing material with zinc, treating with sulfuric acid whereby zinc is dissolved and osmium together with other metallic constituents obtained in amorphous state, filtering, heating the precipitate with a caustic alkali and a chlorate, dissolving the mass thus obtained, filtering whereby there is obtained a filtrate containing osmium and a precipitate containing oxides of other metals, acidifying the filtrate, and extracting the acid solution with an organic solvent.

4. A method for separating osmium from osmium containing materials, which comprises forming an alloy by heating said osmium containing material with zinc, treating with sulfuric acid whereby zinc is dissolved and osmium together with other metallic constituents obtained in amorphous state, filtering, heating the precipitate with sodium hydroxide and sodium chlorate, dissolving the mass thus obtained, filtering whereby there is obtained a filtrate containing osmium and a precipitate containing oxides of other metals, acidifying the filtrate with hydrochloric acid, and extracting the acid solution with carbon tetrachloride.

5. A method for the separation of osmium and ruthenium from other metals of the platinum group, which comprises forming an alloy by heating said osmium containing material with zinc, treating with sulfuric acid whereby zinc is dissolved and osmium together with other metallic constituents obtained in amorphous state, filtering, heating the precipitate with a caustic alkali and a chlorate, dissolving the mass thus obtained, filtering whereby there is obtained a filtrate containing osmium and ruthenium and a precipitate containing oxides of other metals, acidifying the filtrate with a mineral acid, extracting the acid solution with carbon tetrachloride, and then rendering the solution thus extracted alkaline by the addition thereto of an alkali, saturating the alkaline solution with chlorine, and distilling the ruthenium tetroxide so formed by means of a stream of chlorine.

6. A stable osmium solution containing an osmate in an alkaline medium and characterized by content of a hypochlorite.

7. A stable osmium solution containing an alkali metal osmate and an alkali metal hypochlorite.

8. A stable osmium solution containing sodium osmate and sodium hypochlorite.

9. A method for separating osmium from osmium containing materials which comprises converting osmium together with other metallic constituents into an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution with an organic solvent.

10. A method for separating osmium from osmium containing materials which comprises converting osmium together with other metallic constituents into an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution with a halogenated solvent.

11. A method for separating osmium from osmium containing materials which comprises heating said osmium containing materials with a metal soluble in a mineral acid, treating the thus obtained mass with a mineral acid whereby said metal is dissolved and osmium together with other metallic constituents obtained in an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution by means of carbon tetrachloride.

12. A method for separating osmium from osmium containing materials which comprises converting osmium together with other metallic constituents into an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution with a hydrocarbon.

13. A method for separating osmium from osmium containing materials which comprises converting osmium together with other metallic constituents into an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution with an aromatic hydrocarbon.

14. A method for separating osmium from osmium containing materials which comprises converting osmium together with other metallic constituents into an amorphous condition and then heating with a caustic alkali and a strong oxidizing agent, dissolving the mass thus obtained, filtering whereby there is obtained a filtrate containing osmium and a precipitate containing oxides of other metals, acidifying the filtrate, and extracting osmium tetroxide from the acid solution with benzene.

15. A method for recovering osmium from osmium residues consisting primarily of sulfides which consists in treating such residues with sodium hydroxide in the presence of chlorine whereby sodium osmate is formed, converting the osmate into osmium tetroxide by adding hydrochloric acid, and extracting osmium tetroxide from the acid solution by means of an organic solvent.

GÉZA BRAUN.